(12) United States Patent
Mueller

(10) Patent No.: US 7,147,096 B2
(45) Date of Patent: Dec. 12, 2006

(54) WHEELED CONVEYOR RAIL

(75) Inventor: Rolf J. Mueller, Simpsonville, SC (US)

(73) Assignee: Creform Corporation, Greer, SC (US)

( * ) Notice: Subject to any disclaimer, the term of this patent is extended or adjusted under 35 U.S.C. 154(b) by 0 days.

(21) Appl. No.: 11/080,350

(22) Filed: Mar. 15, 2005

(65) Prior Publication Data

US 2006/0090982 A1 May 4, 2006

Related U.S. Application Data

(60) Provisional application No. 60/624,070, filed on Nov. 1, 2004.

(51) Int. Cl.
*B65G 13/00* (2006.01)
(52) U.S. Cl. ..................... 193/35 R; 193/37
(58) Field of Classification Search .............. 193/35 R, 193/37; 198/860.1
See application file for complete search history.

(56) References Cited

U.S. PATENT DOCUMENTS 3,890,755 A * 6/1975 Specht ............... 193/35 R
3,915,275 A * 10/1975 Specht ............... 193/35 R
4,056,180 A * 11/1977 Gunti ................ 193/35 R 2004/0200688 A1 10/2004 Sorgi

FOREIGN PATENT DOCUMENTS

| DE | 2844229 A1 | 4/1980 |
| DE | 4133808 A1 | 5/1992 |
| EP | 05256421.8 | 12/2005 |
| GB | 1181512 | 2/1970 |
| GB | 2023084 A | 12/1979 |
| JP | 2003-020106 | 1/2003 |
| WO | WO 1998/023508 A1 | 6/1998 |

OTHER PUBLICATIONS

Search Report,Mar. 30, 2006, Creform Corporation, Australian.

* cited by examiner

*Primary Examiner*—James R. Bidwell
(74) *Attorney, Agent, or Firm*—Taft, Stettinius & Hollister LLP

(57) ABSTRACT

A wheeled conveyor rail segment has a frustopyramidal cross-sectional shaped support rail, which can be made from roll-formed galvanized steel. A plurality of wheels are joined to the galvanized steel support rail and can rotate with respect thereto, enabling goods to be transported by rolling over the conveyor rail segment. The wheel axles can be held in place by axle bearing units that slide into longitudinal grooves in the support rail. All materials can be made electrically conductive, allowing the conveyor rail segment to be used in applications where control of electrostatic discharge is desired, such as handling semiconductor materials and electronic equipment.

19 Claims, 2 Drawing Sheets

WHEELED CONVEYOR RAIL

CROSS-REFERENCE TO RELATED APPLICATIONS

This application claims the priority of U.S. Provisional Patent Application Ser. No. 60/624,070, which was filed on Nov. 1, 2004, entitled "CONVEYOR RAIL", the disclosure of which is incorporated herein by reference.

BACKGROUND OF THE INVENTION

This invention relates to a conveyor rail, and more specifically to a wheeled conveyor rail.

Wheeled conveyor rails are widely used for movement of goods in many industrial settings. In the typical application, two or more rows of conveyor rails will be pieced together from segments to form a conveyor of the required length and shape, and goods can be transported over (or rolled over) the conveyor. Goods of sufficiently large size can be placed directly on the conveyor for transport, and smaller goods can be placed in containers for transport on the conveyor.

FIG. 1 shows a wheeled conveyor rail segment 10 according to the prior art. The rail segment typically includes an extruded aluminum support rail 12 having an elevated longitudinal groove 14 on each lateral side for seating the axle bearing slides 18, which in turn rotationally receive and support axles 17 (see FIG. 2) of wheels 16. Wheels 16 are typically spaced closely along the rail 12 to provide a smooth, continuous rolling surface, and the wheels are held in place by axle bearing units 18 that slide into the longitudinal grooves in the aluminum support rail.

FIG. 2 is an exploded view showing the wheel assembly 15 of a prior art rail, which contains the wheels 16, axles 17, and axle bearing units 18. Each of the axle bearing units is received into one of the opposing longitudinal grooves 14 in the aluminum support rail 12, thereby holding the wheel assembly 15 in place. The wheels 16 can be made from polypropylene, for example, and the axle bearing units 18 can be made of polystyrene, for example. Both plastics can contain a metallic additive to allow them to conduct electric current, which enables the conveyor rail segment 10 to be used in applications where elimination of electrostatic discharge ("ESD") is critical, such as handling semiconductor materials and electronic equipment.

The conveyor rail of the present invention provides advantages over the prior art conveyor rail, as will be explained below.

SUMMARY

The present invention provides a wheeled conveyor rail segment that has a frustopyramidal cross-sectional shaped support rail, which can be made from roll-formed galvanized steel. A plurality of wheels are joined to the galvanized steel support rail and can rotate with respect thereto, enabling goods to be transported by rolling over the conveyor rail segment. The present invention also provides a method for manufacturing the conveyor rail segment described above.

Accordingly, it is a first aspect of the present invention to provide a conveyor rail segment including: a support rail having an upper wheel-seating portion and a lower base portion, where the lower base portion has a frustopyramidal cross-sectional shape; and a plurality of wheels translationally secured to the upper wheel-seating portion of the support rail and capable of rotating with respect to the support rail; whereby goods can be transported over the conveyor rail segment. In a detailed embodiment, the conveyor rail segment further includes at least one axle for each of the plurality of wheels, where the axle is joined to the wheel through the center of the wheel and is capable of rotating with respect to the wheel; and at least one axle bearing unit secured with respect to the upper wheel-seating portion of the support rail, which is capable of holding at least one axle in a translationally secured state with respect to the support rail, and where the upper wheel-seating portion of the support rail includes at least one longitudinal groove for holding the axle bearing unit. In various more detailed embodiments, the axle bearing unit can be capable of holding a plurality of axles, the longitudinal groove in the body can be capable of holding a plurality of axle bearing units, and the support rail, wheels, axles, and axle bearing units can be made of electrically conductive materials.

In an alternate detailed embodiment of the first aspect of the present invention, the support rail is formed by a roll-forming process. In a more detailed embodiment, the conveyor rail segment further includes at least one axle for each of the plurality of wheels, where the axle is joined to the wheel through the center of the wheel and is capable of rotating with respect to the wheel; and at least one axle bearing unit secured with respect to the upper wheel-seating portion of the support rail and capable of holding at least one axle in a translationally secured state with respect to the support rail, where the upper wheel-seating portion of the support rail includes at least one longitudinal groove for holding the axle bearing unit.

In an alternate more detailed embodiment, the support rail is made of roll-formed galvanized steel. In an even more detailed embodiment, the lower base portion of the support rail includes a substantially horizontal base panel and a pair of inwardly angled side panels extending upwardly from opposing edges of the base panel; and the upper wheel-seating portion of the support rail includes a pair of opposed, inwardly facing, rectangular C-shaped grooves, each of which extends from a respective side panel. In an even more detailed embodiment, the base panel has a width that is substantially equal to a distance between outer walls of the pair of opposed, inwardly facing, rectangular C-shaped grooves.

In an alternate more detailed embodiment, the lower base portion of the support rail includes a substantially horizontal base panel and a pair of inwardly angled side panels extending upwardly from opposing edges of the base panel; and the upper wheel-seating portion of the support rail includes a pair of opposed, inwardly facing, rectangular C-shaped grooves, each of which extends from a respective side panel. In an even more detailed embodiment, the base panel has a width that is substantially equal to a distance between outer walls of the pair of opposed, inwardly facing, rectangular C-shaped grooves.

It is a second aspect of the present invention to provide a method of manufacturing a conveyor rail segment, including the steps of: roll-forming a piece of material to form a support rail, at least a portion of which has a frustopyramidal cross-sectional shape; and joining a plurality of wheels to the support rail such that the wheels are translationally secured with respect to the support rail and capable of rotating with respect to the support rail. In a detailed embodiment, the joining step further comprises the steps of: joining at least one axle to each of the plurality of wheels, where the axle is joined to the wheel through the center of the wheel and is capable of rotating with respect to the wheel; joining the axle to at least one axle bearing unit; and sliding the axle bearing unit longitudinally into a longitudinal groove in the support rail.

In an alternate detailed embodiment of the second aspect of the present invention, the material used to form the support rail is galvanized steel. In a more detailed embodiment, the joining step further includes the steps of: joining at least one axle to each of the plurality of wheels, where the axle is joined to the wheel through the center of the wheel and is capable of rotating with respect to the wheel; joining the axle to at least one axle bearing unit; and sliding the axle bearing unit longitudinally into a longitudinal groove in the support rail.

In an alternate detailed embodiment of the second aspect of the present invention, the lower base portion of the support rail includes a substantially horizontal base panel and a pair of inwardly angled side panels extending upwardly from opposing edges of the base panel; and the upper wheel-seating portion of the support rail includes a pair of opposed, inwardly facing, rectangular C-shaped grooves, each of which extends from a respective side panel. In a more detailed embodiment, the base panel has a width that is substantially equal to a distance between outer walls of the pair of opposed, inwardly facing, rectangular C-shaped grooves.

DETAILED DESCRIPTION

An exemplary embodiment of the present invention provides a support rail for a wheeled conveyor segment that is made from roll-formed galvanized steel. The use of the roll-forming process and the galvanized steel material provide advantages explained below.

Figure 1:
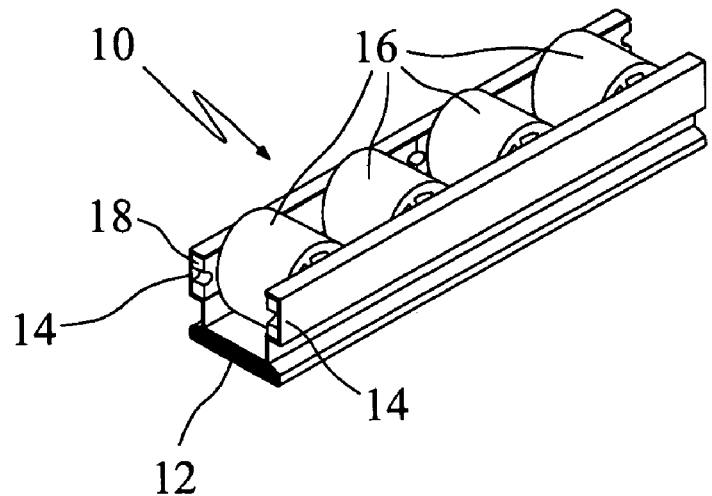
FIG. 1 shows a perspective view of a conveyor rail segment according to the prior art.
Figure 2:
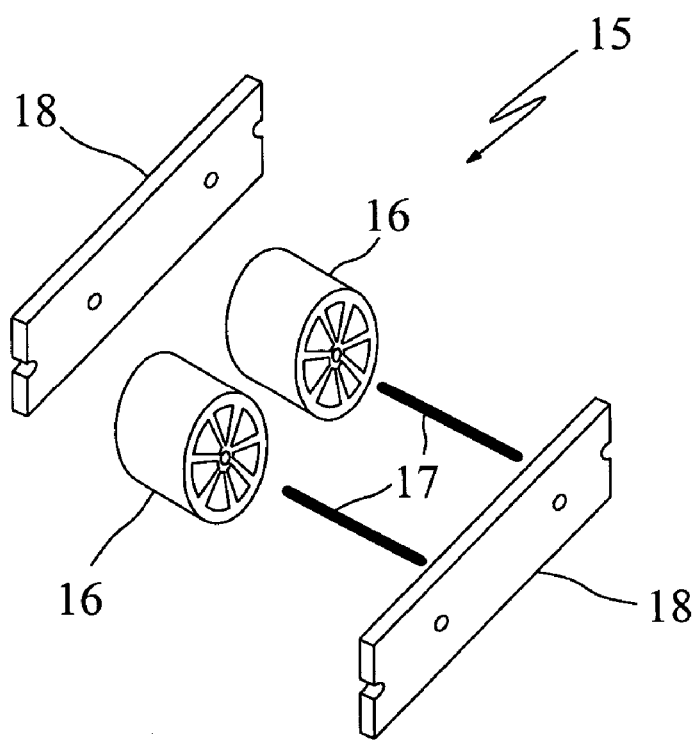
FIG. 2 shows an exploded view of the wheel assembly of a conveyor rail segment according to the prior art.
Figure 3:
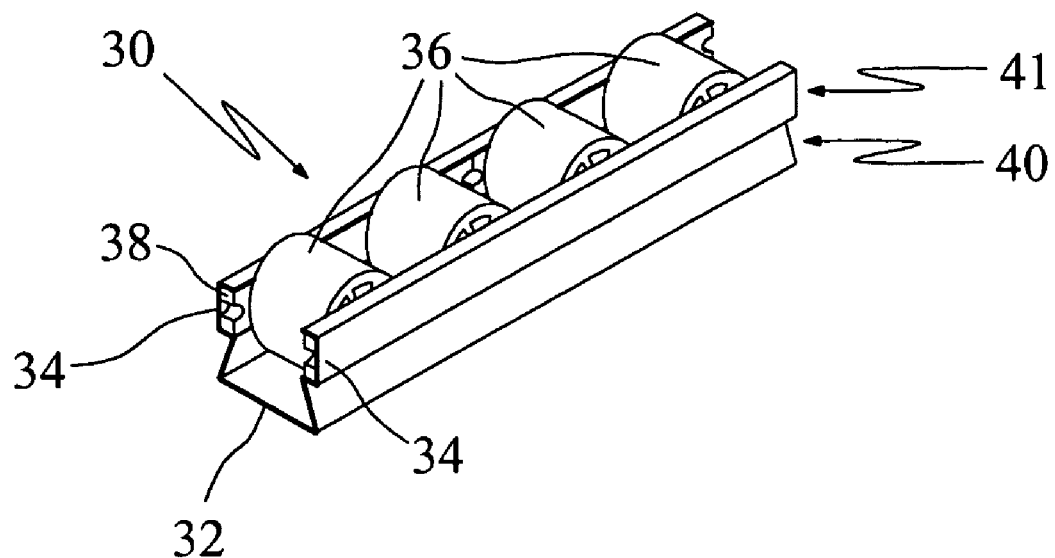
FIG. 3 shows a perspective view of a conveyor rail segment according to an exemplary embodiment of the present invention.

FIG. 3 shows a conveyor rail segment 30 according to an exemplary embodiment of the present invention. The rail segment includes a galvanized steel support rail 32 that can be formed by a process known as roll-forming in a manner known to persons skilled in the art. The galvanized steel support rail 32 has a lower base portion 40 and an upper wheel-seating portion 41. The upper wheel-seating portion 41 has opposing elevated longitudinal grooves 34 on each side for holding opposing sets of the axle bearing units 38. As can be seen in FIG. 3, the grooves are substantially rectangular C-shaped grooves, oriented with inwardly facing openings. Wheels 36 are typically spaced closely to provide a smooth, continuous rolling surface, and the wheels are held in place by axles (in similar manner to the prior art rail segment shown in FIG. 2) and axle bearing units 38 that are seated in the longitudinal grooves in the galvanized steel support rail 32. Each axle bearing unit 38 accepts two support axles of wheels 36, but the axle bearing units can be made to accept any number of support axles and wheels. Similarly, the galvanized steel support rail 32 can be made to accept any number of axle bearing units 38, inserted consecutively into the longitudinal grooves 34, as determined by the length of the galvanized steel support rail 32.

Figure 4:
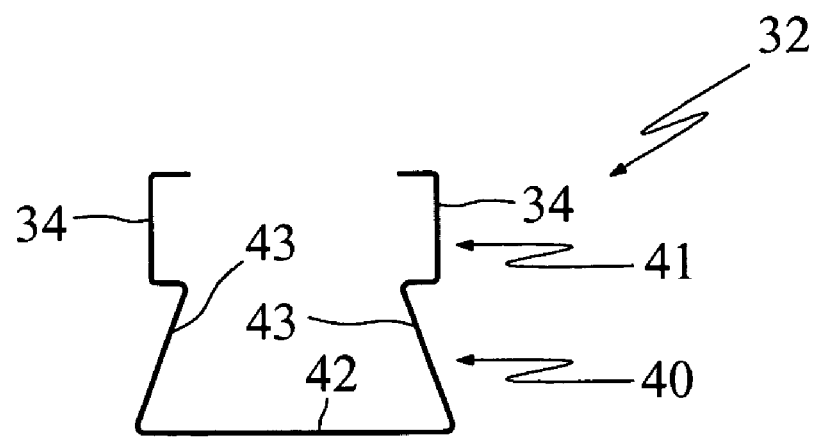
FIG. 4 shows a cross-sectional view of a roll-formed, galvanized steel support rail segment according to an exemplary embodiment of the present invention.

FIG. 4 shows a cross-sectional view of the galvanized steel support rail 32 according to an exemplary embodiment of the present invention. The elevated longitudinal grooves 34 on each lateral side of the galvanized steel support rail 32 are clearly visible on the upper wheel-seating portion 41 of the galvanized steel support rail 32. The lower base portion 40 of the galvanized steel support rail 32 has a frustopyramidal shape in cross-section, which allows the rail to bear more vertical force than if the cross-sectional shape of the prior art rail were formed from galvanized steel, thus providing adequate support for the conveyor rail. A frustopyramidal shape in cross-section can be any shape having a horizontal base panel 42 and two side panels 43, each side panel 43 extending from a respective end of the base panel 42 and rising vertically therefrom, and angled slightly together such that the angle formed by each side panel 43 and the base panel 42 is an acute angle. In an exemplary embodiment, the galvanized steel that is roll formed into the galvanized steel support rail 32 has a thickness of between about 0.7 mm and about 0.8 mm. In an exemplary embodiment, the width of the horizontal base panel is substantially equal to a distance between outer walls of the pair of elevated longitudinal grooves.

Because roll-forming is a continuous process, the support rail can be made directly from of a coil of galvanized steel, which allows the support rail to be made in a wide variety of lengths and subsequently cut to the desired size. For example, the support rail can be made to a desired length and can hold as many axle bearing units and wheels, inserted consecutively into the longitudinal grooves as depicted in FIG. 3, as its length will allow. This provides an advantage over the extrusion process, which produces a narrow range of rail lengths. Additionally, the use of galvanized steel has the advantage of being less costly than aluminum, and less metal is required per foot of rail length in the support rail of the present invention as compared to the prior art conveyor rails.

The wheels 36 can be made from polypropylene, for example, and the axle bearing slides 38 can be made of polystyrene, for example. Of course, those of ordinary skill in the art will recognize that other materials can be readily substituted as desired. The plastic wheels 36 and axle bearing slides 38 can contain a metallic or a conductive additive to allow them to conduct electric current, which enables the conveyor rail segment 30 to be used in applications where control of electrostatic discharge is desired, such as handling semiconductor materials and electronic equipment.

In an alternative embodiment, other materials such as standard steel, aluminum, or plastic can be substituted for the galvanized steel in the galvanized steel support rail 32. In one alternative embodiment, the support rail 32 can be made of roll-formed ordinary steel. In another alternative embodiment, the support rail 32 can be made of extruded aluminum using an extrusion process known to persons skilled in the art. In another alternative embodiment, the support rail 32 can be made of extruded plastic using an extrusion process known to persons skilled in the art.

Having described the invention with reference to embodiments, it is to be understood that the invention is defined by the claims, and it is not intended that any limitations or elements describing the embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A conveyor rail segment comprising:
    a support rail having an upper wheel-seating portion and a lower base portion, the lower base portion having a frustopyramidal cross-sectional shape, a substantially horizontal base panel, and a pair of inwardly angled side panels extending upwardly from opposing edges of the base panel and terminating at the upper wheel-seating portion; and
    a plurality of wheels translationally secured to the upper wheel-seating portion of the support rail and capable of rotating with respect to the support rail;
    whereby goods can be transported over the conveyor rail segment.

2. The conveyor rail segment of claim 1, further comprising:
    at least one axle for each of the plurality of wheels, the axle joined to the wheel through the center of the wheel and capable of rotating with respect to the wheel; and
    at least one axle bearing unit secured with respect to the upper wheel-seating portion of the support rail and capable of holding at least one axle in a translationally secured state with respect to the support rail;
    the upper wheel-seating portion of the support rail including at least one longitudinal groove for holding the axle bearing unit.

3. The conveyor rail segment of claim 2, wherein the axle bearing unit is capable of holding a plurality of axles.

4. The conveyor rail segment of claim 2, wherein the longitudinal groove in the body is capable of holding a plurality of axle bearing units.

5. The conveyor rail segment of claim 2, wherein the support rail, wheels, ales, and axle bearing units are made of electrically conductive materials.

6. The conveyor rail segment of claim 1, wherein the support rail is formed by a roll-forming process.

7. The conveyor rail segment of claim 6, further comprising:
    at least one axle for each of the plurality of wheels, the axle joined to the wheel through the center of the wheel and capable of rotating with respect to the wheel; and
    at least one axle bearing unit secured with respect to the upper wheel-seating portion of the support rail and capable of holding at least one axle in a translationally secured state with respect to the support rail;
    the upper wheel-seating portion of the support rail including at least one longitudinal groove for holding the axle bearing unit.

8. The conveyor rail segment of claim 6, wherein the support rail is made of roll-formed galvanized steel.

9. The conveyor rail segment of claim 8, wherein the upper wheel-seating portion of the support rail includes a pair of opposed, inwardly facing, rectangular C-shaped grooves, each of which extends from a respective side panel.

10. The conveyor rail segment of claim 9, wherein the base panel has a width that is substantially equal to a distance between outer walls of the pair of opposed, inwardly facing, rectangular C-shaped grooves.

11. The conveyor rail of claim 6, wherein the upper wheel-seating portion of the support rail includes a pair of opposed, inwardly facing, rectangular C-shaped grooves, each of which extends from a respective side panel.

12. The conveyor rail segment of claim 11, wherein the base panel has a width that is substantially equal to a distance between outer walls of the pair of opposed, inwardly facing, rectangular C-shaped grooves.

13. A method of manufacturing a conveyor rail segment, comprising the steps of:
    roll-forming a piece of material to form a support rail, at least a portion of which has a frustopyramidal cross-sectional shape; and
    joining a plurality of wheels to the support rail such that the wheels are translationally secured with respect to the support rail and capable of rotating with respect to the support rail.

14. The method of claim 13, wherein the joining step further comprises the steps of:
    joining at least one axle to each of the plurality of wheels, the axle joined to the wheel through the center of the wheel and capable of rotating with respect to the wheel;
    joining the axle to at least one axle bearing unit; and
    sliding the ale bearing unit longitudinally into a longitudinal groove in the support rail.

15. The method of claim 13, wherein the material used to form the support rail is galvanized steel.

16. The method of claim 15, wherein the joining step further comprises the steps of:
    joining at least one axle to each of the plurality of wheels, the axle joined to the wheel through the center of the wheel and capable of rotating with respect to the wheel;
    joining the axle to at least one axle bearing unit; and
    sliding the axle bearing unit longitudinally into a longitudinal groove in the support rail.

17. The method of claim 13, wherein
    the lower base portion of the support rail includes a substantially horizontal base panel and a pair of inwardly angled side panels extending upwardly from opposing edges of the base panel; and wherein
    the upper wheel-seating portion of the support rail includes a pair of opposed, inwardly facing, rectangular C-shaped grooves, each of which extends from a respective side panel.

18. The method of claim 17, wherein
    the base panel has a width that is substantially equal to a distance between outer walls of the pair of opposed, inwardly facing, rectangular C-shaped grooves.

19. A method of manufacturing a conveyor rail segment, comprising the steps of:
    roll-fanning a piece of material to form a support rail having an upper wheel-seating portion and a lower base portion, the lower base portion having a frustopyramidal cross-sectional shape, a substantially horizontal base panel, and a pair of inwardly angled side panels extending upwardly from opposing edges of the base panel and terminating at the upper wheel-seating portion; and
    joining a plurality of wheels to the support rail such that the wheels are translationally secured with respect to the support rail and capable of rotating with respect to the support rail.

* * * * *